Sept. 18, 1923.  
J. H. SCHREIBER  
METHOD OF MAKING PISTON RINGS  
Filed Dec. 17, 1920
1,468,171
2 Sheets-Sheet 2
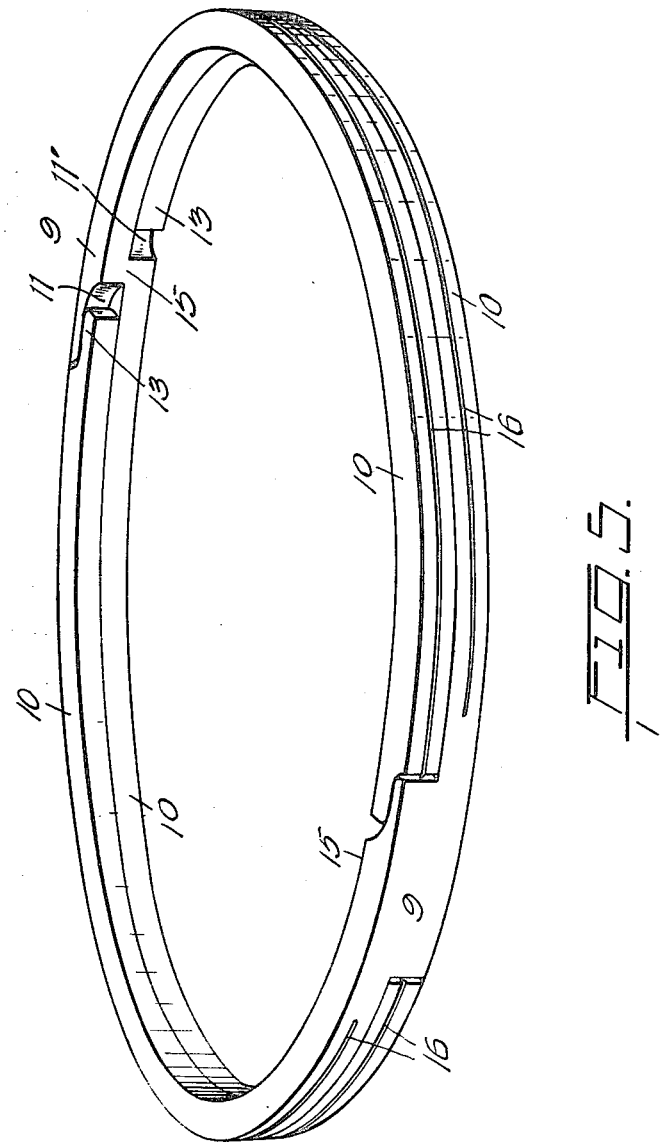
Inventor:  
John H. Schreiber.  
By Fred'k J. Harson  
Attorney.

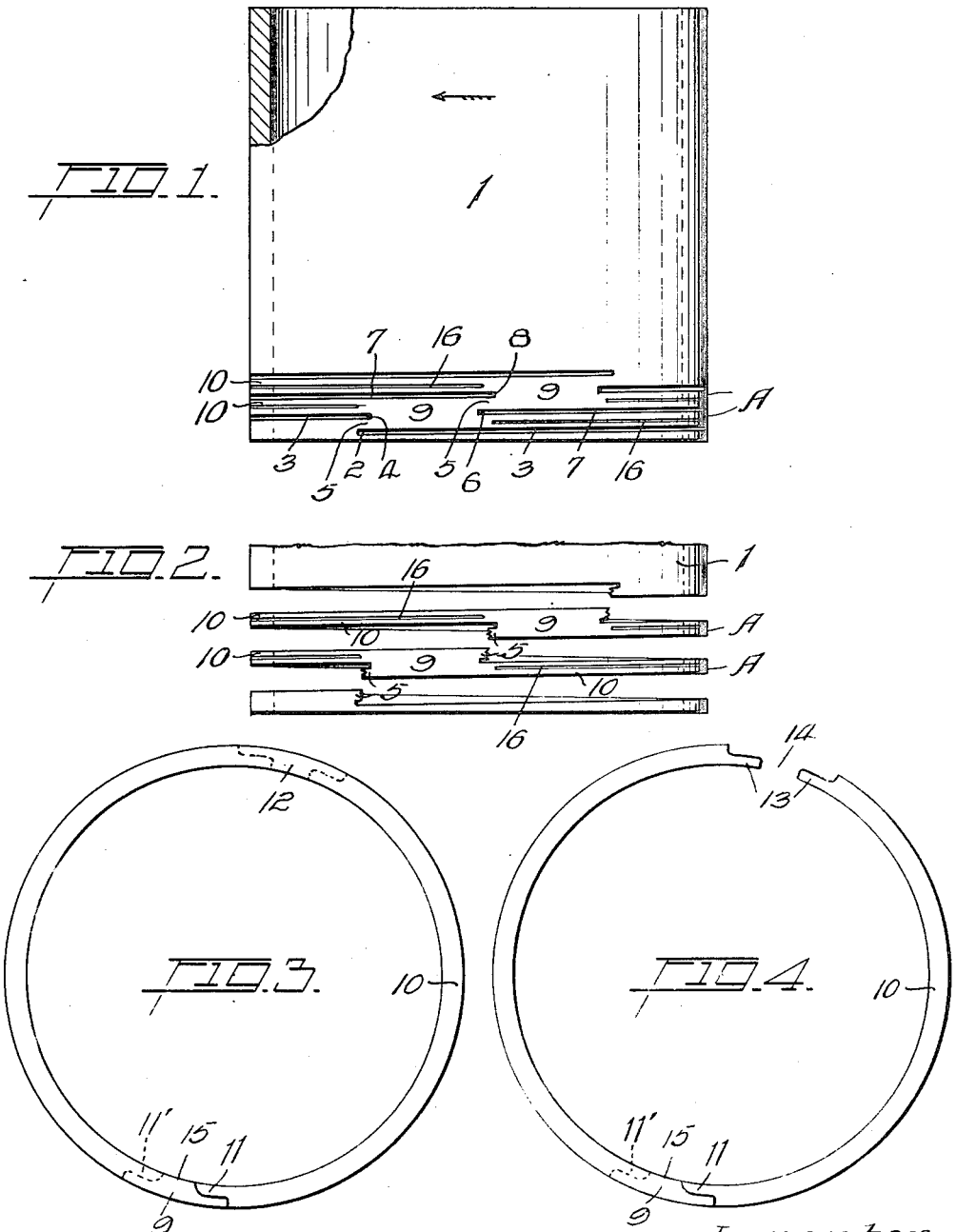

Patented Sept. 18, 1923.

1,468,171

UNITED STATES PATENT OFFICE.

JOHN H. SCHREIBER, OF ST. LOUIS, MISSOURI.

METHOD OF MAKING PISTON RINGS.

Application filed December 17, 1920. Serial No. 431,397.

*To all whom it may concern:*

Be it known that I, JOHN H. SCHREIBER, a citizen of the United States, residing in the city of St. Louis and State of Missouri, have invented a new and useful Method of Making Piston Rings, of which the following is a specification.

This invention relates to a method of making piston ring members for use in two piece piston rings, and, has for its object to conveniently and intermittently spirally cut from a pot, ring members having a central body portion of a width equal to the width of two ring members when assembled so that when the ring members are laid together they will become interlocked to form a practical two piece piston ring.

A further object of the invention is to intermittently spirally cut a pot so as to eliminate all possible waste.

With the above and other objects in view, the method consists in the novel steps, or operations performed upon a metallic pot, as herein described and finally pointed out in the claims hereto appended.

Fig. 1, is a view of a pot showing the first three intermittent spiral cuts made therein.

Fig. 2, is a view showing a plurality of ring members broken apart.

Fig. 3, is a plan view of one ring member showing one of the sockets milled therein.

Fig. 4, is a view showing a ring broached diametrically opposite the sockets.

Fig. 5, is a perspective view of two ring members assembled to form a complete two piece piston ring.

The method of making piston rings, such as illustrated in Fig. 5, of the drawing, and in the drawings of my co-pending application, Serial Number 408,263, consists of the following operations upon a continuously revolving metallic pot.

After the cast-iron pot is mounted upon a suitable machine for holding, and for continuously revolving the pot in one direction at a predetermined speed, the first operation performed is the intermittent spiral cutting of the pot to provide the ring members, designated A in Figs. 1 to 4, inclusive. A suitable cutter, not shown, such as a circular saw is suitably applied to the metallic pot 1, as at 2 commencing at one end of the pot 1, as is manifest. See Fig. 1. As the pot revolves in direction of arrow shown in Fig. 1, the saw automatically moves longitudinally of the pot, cutting as it moves along the revolving pot, a spiral path, or inter-ring space 3 ending at 4 which is just a little past and adjacent the starting point 2, thereby forming the intermediate weak breaking body 5. At the end of cut 3, the saw is withdrawn from the inter-ring space 3 and moved longitudinally along the pot 1, a distance equivalent to the thickness of the saw blade, as the pot revolves. The saw is then again applied to the pot at the new starting, or cutting point, designated 6, as shown in Fig. 1, which, it will be observed, is a suitable distance from the end 4 of cut 3. As the pot continues to revolve and the saw moves longitudinally thereof at the same time, the second spiral cut is performed upon the pot forming the inter-ring space 7, which ends as at 8 just a little past and adjacent the second starting point 6 thereby forming the second intermediate weak breaking body 5. It will be observed that one ring member has now been formed, or cut from the pot 1, and, that in repeating these same intermittent spiral cutting operations until the entire pot 1 has been cut, a plurality of ring members will be formed ready for severance from each other through a breaking off operation.

It will be here observed that by the intermittent spiral cutting operation, each cut forms, after the second cut has been made, a solid body portion 9, which is the width in side elevation, of the piston ring proper, and, that the first two cuts form a ring member which has a central body portion 9 and a ring connection 10 starting at diagonally opposite points at the ends of the central body portion 9, as clearly shown in Figs. 2 and 3.

After the pot 1 has been cut from end to end, as set forth, each ring member is separated, or broken from the pot at the intermediate weak breaking bodies 5, as clearly illustrated in Fig. 2. In Fig. 2, the ring members are shown as having been broken and separated from the pot 1.

The next operation is individual upon the ring members, designated A. It is the milling of a pocket 11 in the upper and inner face of the central body portion 9 and the milling of a pocket 11' in the lower and inner face of the central body portion 9, as indicated by dotted lines in Fig. 3. These pockets 11 and 11' are arranged diagonally opposite each other at each end of the central body portion 9, as is manifest, and as clearly shown in Fig. 5, which is a perspective view of two like ring members assembled to form a two piece piston ring proper.

The next operation is the machining or broaching of the ring members from the outer surface inwardly, at that portion of the ring designated 12 in Fig. 3, which is diametrically opposite the central body 9. The broaching operation, it will be observed, forms two opposed tongues 13, as shown in Fig. 4, which are spaced apart to form an open space 14 to be bridged, or filled by that portion of the central body portion 9, designated 15, which is located intermediate the pockets 11 and 11', when two ring members A are assembled to form a complete two piece piston ring, as shown in Fig. 5.

When an oil groove 16 is desired upon the peripheral surface of each ring member A, it is suitably formed by a cutting operation at the same time that the intermittent ring severing cuts are made in the pot, as is manifest. The groove is preferably formed by the use of a suitable saw, not shown, preferably smaller in diameter than the saw making the intermittent spiral ring severing cuts.

The grinding operation, which is final, may be done in any well known manner to properly finish the upper and lower surfaces of the piston ring after two ring members have been assembled. This also gives the ring, when assembled, its standard width dimension. The assembled ring is held in a compressed position during the grinding of its peripheral face, as is manifest.

It will be understood that by using the herein described method of making piston rings, for use in two piece pistons, that there is no waste excepting the material from the inter-ring spaces due to the cutting, by the saw, and a small end piece at each end of the pot. This is all due to the intermittent spiral cutting operations, as clearly set forth.

The many advantages of making piston rings as herein described, will readily suggest themselves to those skilled in the art to which it appertains.

There may be slight changes, or modifications made in the method of making piston rings as set forth, and as the drawings are merely illustrative of the essential operations performed upon the pot and the severed ring members, I do not wish to be understood as having limited myself by such illustrations and their descriptions, hence I wish it to be understood that I reserve the right to make any such changes in the method of making piston ring members, as may fairly fall within the appended claims when fairly construed.

What I claim is:

1. The herein described method of making piston ring members for use in two piece piston rings, which consists in cutting offset over-lapping spiral grooves to provide a temporary tie section between each ring member.

2. The herein described method of making piston ring members, for use in two piece piston rings, which consists in spirally cutting over-lapping slots through the wall of a metallic pot in such manner as to leave tie sections which are spirally offset around the periphery of the pot to provide central body portions on ring members and said central body portions being offset around the periphery of the pot.

3. The herein described method of making piston rings, which consists in cutting from a metallic pot rings with a short body portion approximately double the thickness of the normal section and said body portions being offset around the periphery of the pot.

4. The herein described method of making piston ring members for use in two piece piston rings, which consists in the intermittent spiral cutting of a metallic pot to provide temporary ring member tie sections intermediate adjacent ring members which tie sections may be easily broken for severing the adjacent ring members after a pot has been cut into ring members from end to end, milling a portion of the ring member to provide sockets at the ends of the larger section thereof, and broaching the ring member diametrically opposite the sockets in the larger portion of the ring member for reception in the sockets of an adjacent ring member when two ring members are assembled, one upon the other to provide a two piece piston ring.

5. The herein described method of making piston ring members for use in two piece piston rings, which consists in the intermittent spiral cutting of a metallic pot to provide temporary ring member tie sections intermeliate adjacent ring members which tie sections may be easily broken for severing the adjacent ring members after a pot has been cut into ring members from end to end, milling of a portion of the ring member to provide sockets at the ends of the larger section thereof, broaching the ring member diametrically opposite the sockets in the larger portion of the ring member for reception in the sockets of an adjacent ring member when two ring members are assembled, one upon the other to provide a two piece piston ring and finally grinding the upper, lower and peripheral surfaces of the ring after two ring members have been assembled and compressed to reduce the ring members to the desired width and diameter.

6. The herein described method of making piston ring members for use in two piece piston rings which consists in cutting overlapping spiral grooves in a ring pot, the starting point of each groove being offset from the preceding groove to provide an enlarged body portion on each ring member.

7. The herein described method of making piston ring members, which consists in spirally cutting a revolving metallic pot to a point slightly past the starting point, then skipping a suitable distance to provide a central body portion and starting a new spiral cut after moving the cutter longitudinally of the pot a distance equal to the thickness of the cutter, and repeating the intermittent cutting operation until the entire pot has been cut, breaking off the ring members cut from the pot, cutting a pocket in opposite faces of the ring at diagonally opposite inner corners of the central body portion thereof, and finally broaching the ring diametrically opposite the central body portion thereof to provide two opposed tongues for interlocking engagement with the pockets of an adjacent ring when assembled to provide a two piece piston ring.

8. The herein described method of making piston rings, which consists in cutting overlapping spiral slots into the wall of a metallic pot in such a way as to leave an enlarged body portion on each ring and said body portions being spirally offset around the periphery of the pot.

In testimony wherof I have hereunto signed my name to the specification.

JOHN H. SCHREIBER.